United States Patent [19] [11] Patent Number: 4,714,593
Naito et al. [45] Date of Patent: Dec. 22, 1987

[54] REFORMING APPARATUS

[75] Inventors: Akio Naito; Hirohisa Uozu; Toru Numaguchi, all of Chiba, Japan

[73] Assignee: Toyo Engineering Corporation, Tokyo, Japan

[21] Appl. No.: 22,840

[22] Filed: Mar. 6, 1987

[30] Foreign Application Priority Data

Mar. 10, 1986 [JP] Japan .................................. 61-53346

[51] Int. Cl.$^4$ .............................. B01J 7/00; B01J 8/06
[52] U.S. Cl. ........................................ 422/197; 48/94; 422/204; 422/205
[58] Field of Search ............... 422/197, 204, 205, 211, 422/196; 48/74, 94, 196 A, 196 R

[56] References Cited

U.S. PATENT DOCUMENTS 4,098,588 7/1978 Buswell et al. ........................... 48/94
4,098,589 7/1978 Buswell et al. ........................... 48/94
4,371,452 2/1983 Ohsaki et al. ......................... 422/204

FOREIGN PATENT DOCUMENTS 1482 6/1982 Japan .
78906 5/1984 Japan ................................... 422/197
103001 6/1985 Japan ................................... 422/197
264302 12/1985 Japan ................................... 422/197

Primary Examiner—Barry S. Richman
Assistant Examiner—Joye L. Woodard
Attorney, Agent, or Firm—Flynn, Thiel, Boutell & Tanis

[57] ABSTRACT

An apparatus for an endothermic reaction, such as steam reforming of hydrocarbon gas, comprises a reaction vessel sandwiched or surrounded by heat generating apparatus. In the heat generating apparatus, a primary fuel gas and air are supplied and mixed therein, then pass through a fuel gas heating section therefor, a combustion catalyst bed, a combustion section and a discharge section in that order. A secondary fuel gas is supplied into the combustion section, typically in a plurality of stages. The primary fuel gas mixture is heated up or ignited in the preheating section, burns and passes through the catalyst bed. At least a part of the combustion section is packed with heat transfer bodies. The gas from the catalyst bed burns in the combustion section with the secondary fuel. The heat transfer bodies receive heat from the combustion gas passing therethrough by convection and radiates the heat to the reaction vessel. The heat of the combustion gas is thereby transferred to the reaction gas flowing, countercurrently with the combustion gas, through the reaction vessel wall by radiation from the heat transfer bodies. The reaction product gas is recovered through the reaction vessel countercurrently with the incoming reaction gas, thereby giving its heat to the incoming reaction gas. An even distribution of heat supply along the entire length of the flow path of the reaction gas, reduction of apparatus size, decrease in limitations on the heat-resistant materials that can be used in the apparatus, and easier designing, construction, maintenance and control of the apparatus are achieved.

12 Claims, 10 Drawing Figures

REFORMING APPARATUS

This invention relates to a reforming apparatus in which a principal raw material or feedstock, such as hydrocarbons and alcohols, and, optionally, an auxiliary raw material or feedstock, which can be used if required, (both materials being collectively referred to as the raw material hereinafter) are subjected to a strongly endothermic reforming reaction at a high temperature, thereby producing a reformed product gas. More specifically, this invention relates to a reforming apparatus which permits a remarkable reduction of the space required for the high temperature gas to heat the reaction vessel or vessels. The invention achieves a better supply of heat to the reaction vessel or vessels in the reforming reaction as described above, when the vessel or vessels, such as metal tubes, for use in the gaseous endothermic reaction and through which the raw material is allowed to flow, are heated by utilizing the high temperature produced by the combustion of a fuel.

In a reforming apparatus, the reforming reaction is carried out by heating a raw material, which is allowed to flow through reaction vessels, such as metal tubes, to a temperature of 500° C. or higher by the gaseous products of combustion of a fuel, hereinafter referred to as the combustion gas, which is allowed to flow outside the reaction vessels. Such a reforming apparatus is conventionally used, for example, for reforming a hydrocarbon with steam to convert it into a gas containing hydrogen and carbon oxides or for thermally cracking a hydrocarbon to convert it into gaseous hydrocarbons comprising olefins, such as ethylene and propylene.

In these conventional reforming apparatuses, heat is transferred principally by gas radiation from the combustion gas to the surfaces of the reforming reaction vessels. In such conventional processes, the combustion gas is low in density and, therefore, radiates a small amount of heat per unit volume thereof. Accordingly, in order to increase the heat radiation from the combustion gas to a given unit surface area of the reaction vessels, such as reforming tubes, it is necessary to increase the volume of the chamber (hereinafter simply referred to as a heating chamber) in which the reforming reaction vessels are disposed. The combustion gas is caused to flow in contact with the surfaces of the reaction vessels. The thickness of the combustion gas volume in contact with the reaction vessels is increased by increasing the volume of the heating chamber. As a result, these processes have the drawback that the entire heating chamber which houses a number of reaction vessels is so greatly increased in volume as to make difficult the miniaturization (size reduction) of the apparatus and to increase the construction cost of the apparatus.

In Japanese Patent Laid-Open No. 78983/1978 U.S. Pat. No. 4,098,589 and Japanese Patent Laid-Open No. 78906/1984, there are disclosed specific apparatuses in which a raw material for a reforming reaction is caused to flow through a number of reforming tubes arranged in parallel with each other.

In Japanese Patent Laid-Open No. 78983/1978, the apparatus has a structure in which a burner cavity for fuel is installed separately, a number of globular packing materials or the like are filled, in contact with the outer surface of the reforming tube, in a narrow annular combustion gas passage space along the outer surface of the reforming tube, and the combustion gas is caused to flow through the spaces between the packing materials in the annular space. In this structure, however, insufficient miniaturization (size-reduction) of the heating chamber system is achieved because the use of the packing materials, etc., causes the flow resistance of the combustion gas to increase, the burner cavity is installed independently, and an annular combustion gas passage space is provided around each reforming tube whereby another space is formed between adjacent annular gas passage spaces.

In Japanese Patent Laid-Open No. 78906/1984, the heating chamber cannot be miniaturized (reduced in size) to a sufficient degree because there is provided a porous tubular covering surrounding the outer surface of the reforming tube and spaced from the outer surface of the reforming tube.

In Japanese Patent Publication No. 1482/1982, there is disclosed the use of reactor tubes buried in regenerative bodies (small balls or pebbles made of refractory material) with a view to utilizing the heat of a heating medium obtained from a high temperature gas reactor (HTGR). However, this publication only discloses the utilization of heat generated outside of the system and, moreover, by means other than combustion. There is no disclosure of miniaturizing the entire apparatus (reducing the entire apparatus in size).

An object of the present invention is to provide an apparatus for performing the reforming reaction, which apparatus can be made smaller in size than the above-described conventional apparatuses in such a manner that the heat required for the reaction is supplied efficiently at a proper temperature distribution with less flow resistance of the combustion gas and, thus, with a reduced pressure drop due to the flow of the gas.

According to the invention, there is provided a reaction apparatus comprising at least one reaction vessel for effecting an endothermic reaction and heat generation means surrounding or disposed on opposite sides of said reaction vessel. The heat generation means comprises a mixing chamber at one end thereof, means for supplying primary fuel gas and an oxygencontaining gas to the mixing chamber so that the primary fuel gas and oxygen-containing gas are mixed together in the mixing chamber, a preheating chamber for preheating the mixture of fuel gas and oxygen-containing gas, a gas-permeable catalyst bed containing a catalyst for causing combustion of the primary fuel gas, a combustion chamber for receiving the burning mixture from the catalyst bed, the combustion chamber containing secondary fuel gas supply means for supplying additional fuel gas to the combustion chamber, the combustion chamber containing heat-transfer bodies at least partially filling said combustion chamber, and discharge means for discharging gaseous products of combustion from the combustion chamber. The mixing chamber, the preheating chamber, the gas-permeable catalyst bed, the combustion chamber and the discharge means are arranged in series in that order from said one end of said heat generation means to the opposite end thereof.

The reaction vessel is surrounded or is contacted on opposite sides thereof by the combustion chamber, so that heat is transferred from the combustion chamber to the reaction vessel.

A reactant gas is supplied to the reaction vessel at a location beyond the opposite end of the heat generation means. The reactant gas flows through the reaction vessel in a direction opposite to the direction in which fuel gas and gaseous products of combustion of the fuel gas flow through the heat generation means whereby to cause the reactant gas to react to form a reaction product gas. At least one discharge passage extends into said reaction vessel for isolating the reaction product gas from the reactant gas and flowing it through the reaction vessel in the same direction as the direction in which fuel gas flows through the heat generation means.

DESCRIPTION OF THE PREFERRED EMBODIMENTS

The present invention is described more specifically with reference to the following preferred embodiments.

Figure 1A:
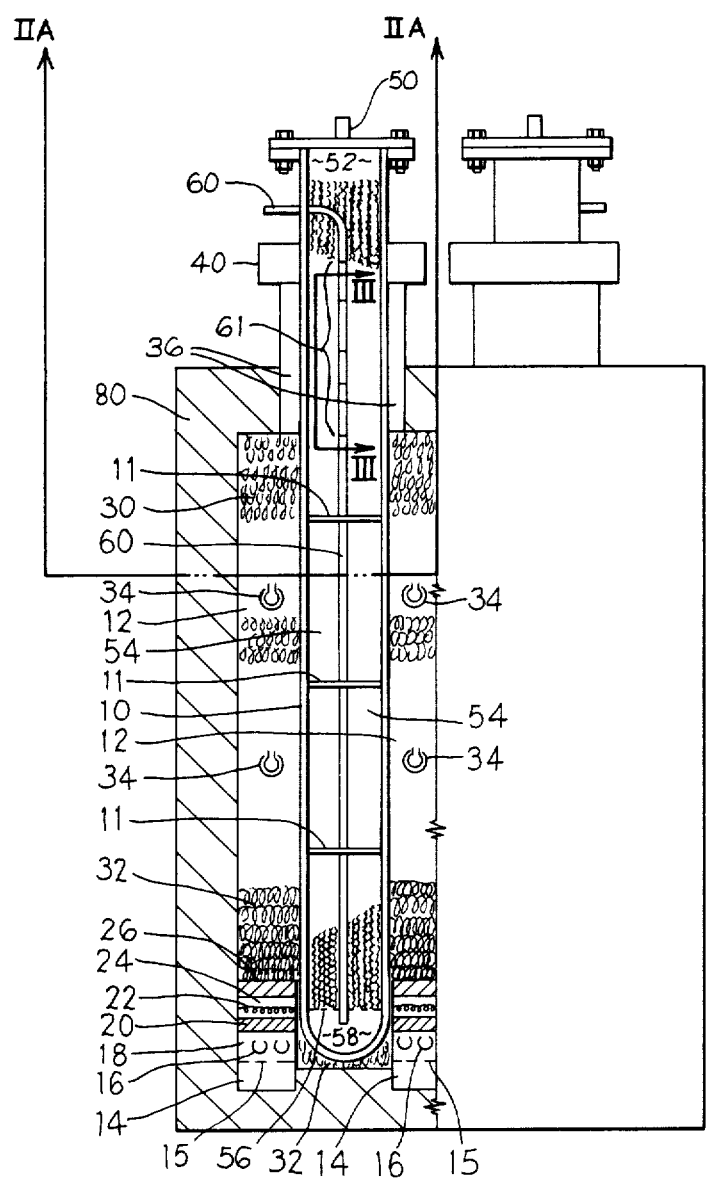
FIG. 1A is a half-sectional view of a first embodiment of a reaction apparatus, according to the invention.
Figure 1B:
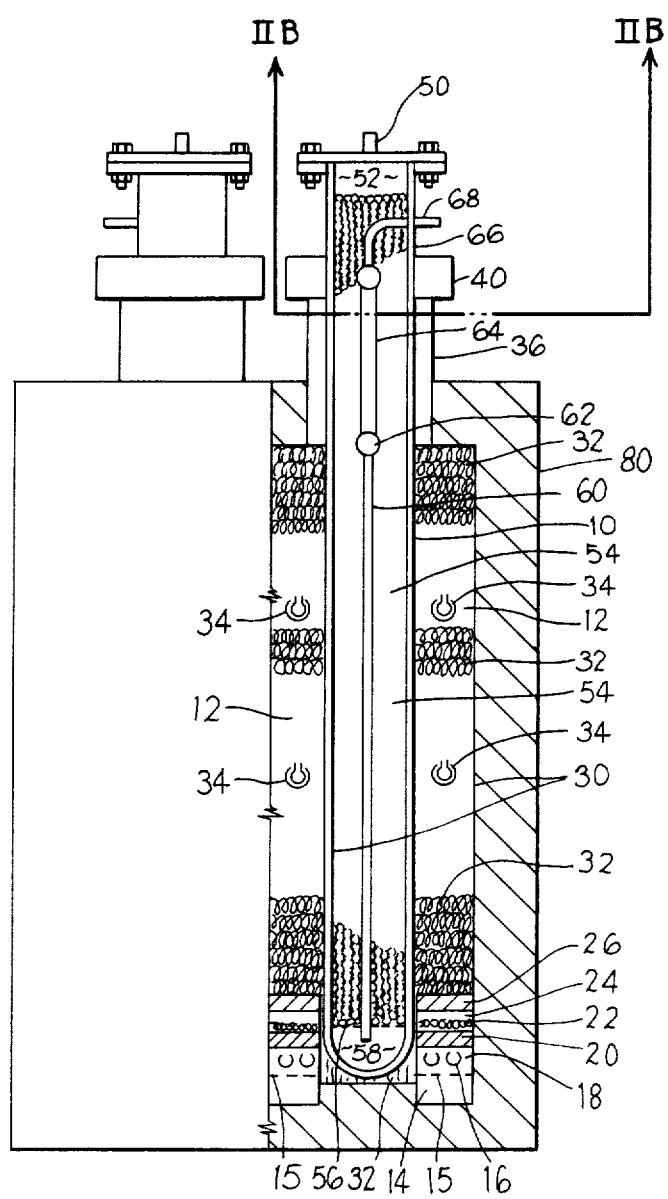
FIG. 1B is a half-sectional view of a second embodiment of a reaction apparatus, according to the invention.
Figure 2A:
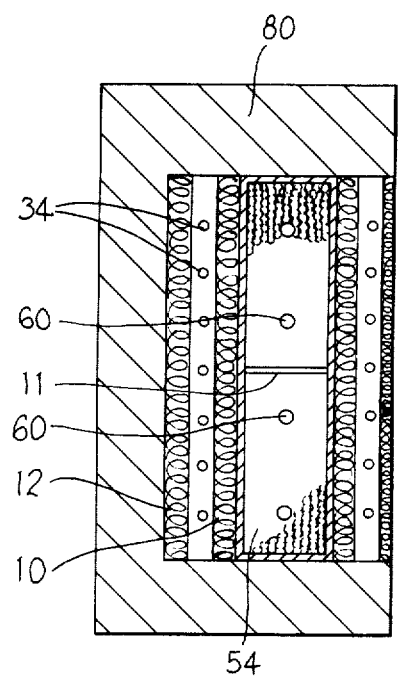
FIG. 2A is a sectional view taken along line IIA—IIA of FIG. 1A.
Figure 2B:
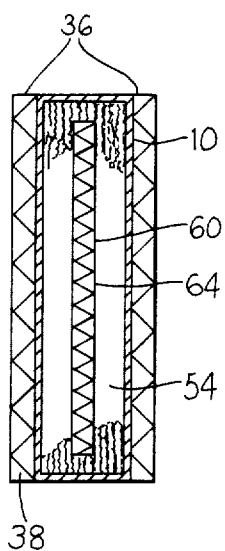
FIG. 2B is a sectional view taken along the line IIB—IIB of FIG. 1B.

FIGS. 1A, 1B, 2A and 2B are schematic illustrations of the vertical cross sections (FIGS. 1A and 1B) and horizontal cross sections (FIGS. 2A and 2B) of two apparatuses according to the present invention. These apparatuses are similar to each other and the same reference numbers are used to identify corresponding parts. FIGS. 1A and 2A illustrate an apparatus having one type of recovery passage at the upper end of the apparatus, as will be described in greater detail hereinbelow. FIGS. 1B and 2B illustrate an apparatus having a second type of recovery passage.

In both of FIGS. 1A and 1B, two, flat, box-type, reaction vessels 10 for the gaseous endothermic reaction are provided in the heating chamber 80. The vessels 10 are of elongated U-shape in vertical cross section. The vessels 10 are of rectangular shape in horizontal cross section (FIG. 2A). Braces 11 are provided in both vessels 10. The braces 11 have been omitted from the right hand vessel in FIG. 1B in order to simplify the figure.

The two reaction vessels 10 are sandwiched by three heat generation units 12 in such a way that the heat generation units are like the bread and the reaction vessels are like the filling of a sandwich. An apparatus which comprises two heat generation units 12 at the opposite lateral ends thereof, two or more reaction vessels 10 and additional heat generation units 12 alternately arranged between the reaction vessels 10 in the above manner is included in the present invention, regardless of the total number of heat generation units 12 and reaction vessels 10 that it comprises. The adoption of such a structure makes it possible for the entire apparatus to be made smaller, per unit of reaction product that is produced, and the design work to be made simple, easy and rapid.

Figure 5:
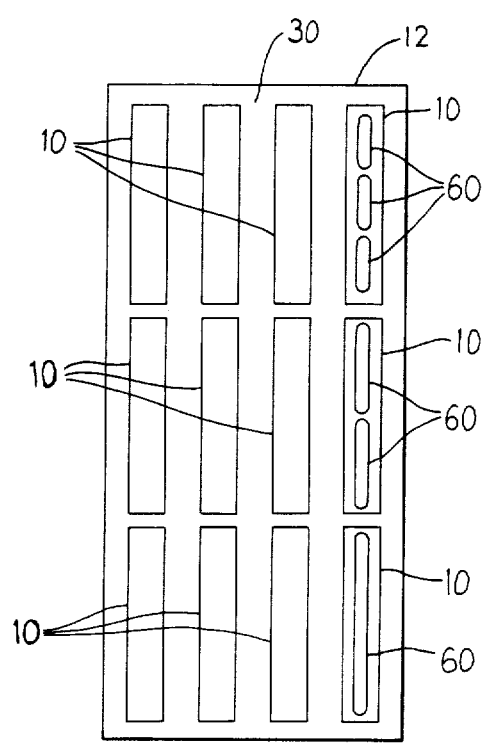
FIG. 5 is a schematic plan view of a third embodiment of a reaction apparatus according to the invention.

The intermediate heat generation unit 12 which is disposed between the two reaction vessels 10 can be made thicker than the heat generation units 12 which are located at the opposite lateral ends of the array of heat generation units 12 and reaction vessels 10, because the intermediate unit 12 has to supply heat to both of the two reaction vessels 10 on opposite sides thereof. Alternatively, the intermediate heat generation unit 12 can be comprised of two independent heat generation units 12 having an insulating layer sandwiched therebetween. The latter structure is particularly suitable when the operation of the apparatus of the present invention has to be changed in accordance with the required volume of the product gas. Alternatively, the reaction vessels 10 may be arranged in longitudinally and laterally spaced-apart relation within a large heat generation unit 12 as shown in FIG. 5.

Each of the heat generation units 12 has a structure in which the following functional sections are arranged or stacked one above the other, from the bottom to the top of the unit, as shown in FIGS. 1A and 1B:

an air duct 14 having a partition plate 15 with holes therethrough for injecting upwardly an oxygen-containing gas (air in this case) from the upper end of the duct 14;

a mixing chamber 18 for mixing a primary fuel gas with the oxygen-containing gas, which chamber houses a primary fuel gas inlet pipe 16 therein and is positioned above the partition plate 15;

a porous partition section 20 comprising a stack of metal nets (for example, Koch Sulzer packing), a layer of porous ceramic objects (for example, Raschig rings, Berl saddles, etc.) or various inorganic packing materials;

a preheating chamber 24 containing a heating unit 22;

a gas-permeable catalyst bed 26 comprising a porous ceramic, such as cordierite, carrying a platinum catalyst, or an inorganic fiber- or wire-mesh material assembly carrying the platinum catalyst;

a vertically elongated combustion chamber 30;

a heat recovery passage 36; and a duct 40 for discharging the gaseous products of combustion of the fuel.

The elongated combustion chamber 30 is at least partially packed with heat-transfer bodies 32 which transfer heat, primarily by radiation, to the vessel 10. The heat-transfer bodies 32 comprise a rigid or arranged packing made of wire mesh, typically made of nichrome wire, or a random or dumped packing made of bulky, large surface-area packing material, such as ceramic rings. At least part of the packing material carries a catalyst capable of effecting oxidation combustion of the fuel gas, such as a platinum catalyst, if necessary. In addition, in order to improve the supply of heat, secondary gas fuel supply nozzle units 34, generally a plurality of such units, are arranged in vertically spaced-apart relation within the combustion chamber 30.

Only parts of the heat transfer bodies 32 are shown in FIGS. 1A and 1B for purposes of clarity. The combustion heating chamber 30 is preferably completely packed with the heat transfer bodies 32.

Figure 4A:
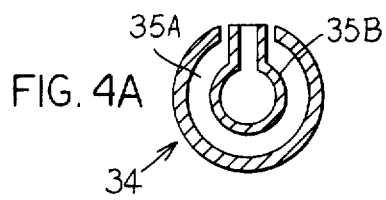
FIG. 4A is a sectional view taken along line IVA—IVA of FIG. 4B.
Figure 4B:
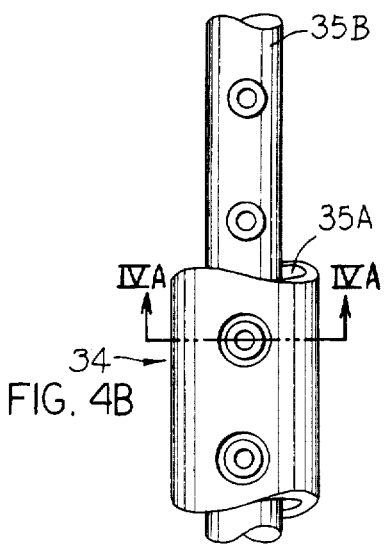
FIG. 4B is a plan view of a nozzle unit.

The nozzle units 34 may open, for example, from pipes disposed inside the surrounding insulating wall 80, instead of from pipes disposed in the combustion chamber 30, as shown in FIGS. 1A and 1B. It is preferable to use, for example, a nozzle unit 34 having a ceramic coating or made entirely of ceramic in order to avoid coking due to the heating of the fuel in the nozzle unit from the outside. In some cases, the nozzle unit 34 can have a double tube construction as shown in FIGS. 4A and 4B in which cooling air is flowed in the annular zone 35A surrounding the inner tube 35B through which the fuel flows. In this case, the cooling air is generally used as the air for combustion thereafter.

The heat recovery passage 36 is annular in crosssection and is of lesser radial width than the combustion chamber 30 that communicates with this passage 36, as shown in FIGS. 1A and 1B. The upper part of the outer wall of the reaction vessel 10 defines the radially inner wall of the heat recovery passage 36. The passage 36 preferably contains means for increasing heat transfer between the gas flowing in the reaction vessel 10 and the gas flowing in the passage 36. For example, various packing materials, including fins projecting outwardly from the upper part of the outer wall of the reactor 10 or a shaped plate, such as a corrugated plate 38 (FIG. 2B) can be disposed in the passage 36. The heat recovery passage 36 may be formed as two plates which faces each other.

Enough air, combined with the aforementioned cooling air, to eventually burn the primary and secondary fuel is supplied from the air duct 14 and flows through the holes in the partition plate 15 into the mixing chamber 18 where it is mixed with the primary fuel supplied from the nozzles of the inlet pipe 16. The fuel-air mixture is further mixed intimately in the porous partition section 20 which generally comprises an inorganic material, such as a metal wire mesh, ceramic porous bodies or various other kinds of packing materials. The resulting mixture, containing oxygen in an amount stoichiometrically in excess of the amount required to burn the fuel, is preheated in the preheating chamber 24 by means of the heating unit 22 and generally is ignited in the combustion catalyst bed 26 which is positioned downstream from the preheating chamber and carries a platinum catalyst.

The heating unit 22 provided in the preheating chamber 24 preheats the gaseous fuel-air mixture to a temperature above the temperature at which a continuous combustion reaction of the gaseous mixture takes place, by means of the oxidation catalyst carried on the catalyst bed 26, at the start-up of the operation. After the temperature of the fuel-air mixture has once reached a sufficiently high temperature in the preheating chamber 24, at which temperature a further continuous combustion reaction takes place by a combustion reaction in the catalyst bed 26, the preheating of the gaseous mixture by the heating unit 22 can be discontinued. The fuel-air mixture can also be ignited in the preheating chamber 24 by raising the temperature of the heating unit 22 to red heat and feeding the fuel-air mixture thereinto. If the fuel-air mixture is burned or ignited in the catalyst bed 26 by use of the heating unit 22 of the preheating chamber 24 at the start-up of the apparatus of the present invention, the gaseous fuel-air mixture supplied thereafter, even if it contains oxygen in an amount in excess of the amount required to burn the fuel, starts to burn in the catalyst bed 26 situated between the preheating chamber 24 and the combustion chamber 30 and carrying a platinum catalyst, and generates heat by the continuous combustion in said catalyst bed and in the upstream part of the combustion chamber 30 with the help of said catalyst.

The porous partition section 20 serves to prevent a backfire to the mixing chamber 18 and to maintain flow of the combustion heat in the direction of the catalyst bed 26, without allowing it to flow back into the mixing chamber 18. In some cases, the catalyst bed 26 supports the heat-transfer bodies 32 in the combustion heating chamber 30; and prevents the heat generated in the combustion heating chamber 30 from flowing back toward the preheating chamber 24. Further, the platinum catalyst carried on the catalyst bed 26 helps the gaseous mixture flowing from the preheating chamber 24 to burn continuously.

In the combustion chamber 30, the gaseous mixture comprising the secondary fuel supplied from the supply nozzle units 34 provided in a plurality of spaced-apart stages along the flow direction of the combustion gas, the secondary air which has been used for cooling the nozzle units 34, and the burning fuel-air mixture from the catalyst bed 26 are subjected to a stable and uniform secondary combustion utilizing the heat-transfer bodies 32, which are at a high temperature, as an ignition source. The secondary combustion of the fuel gas and the multistage supply of the secondary fuel gas also serve to prevent the generation of an excessively high temperature in the combustion chamber 30 and thereby protect the heat-transfer bodies 32 used in the present invention.

The heat-transfer bodies 32 contribute greatly to transfer the thus-generated heat to the reaction vessel 10 not by gas radiation, but rather, by radiation from a solid. The combustion heat generated in the combustion chamber 30 is transferred from the combustion gas to the heat-transfer bodies 32 primarily by convection heat transfer via the remarkably large surface area of the heat-transfer bodies 32. The combustion heat is further transferred from the bodies 32 to the catalyst bed 54 in the reaction vessel 10 and to the gas flowing therethrough via the wall of the reaction vessel 10 as radiation heat emitted from the heat-transfer bodies 32.

The heat-transfer bodies 32 can be distributed uniformly throughout the entire combustion chamber 30. However, when the heat transfer bodies 32 are distributed at a low density or are not provided at all in the zone or zones around nozzle units 34 where the additional combustion heat is generated, and the heat transfer bodies are distributed densely in a zone or zones where less or none of the additional combustion heat is generated, the object of the present invention is achieved well.

Figure 6:
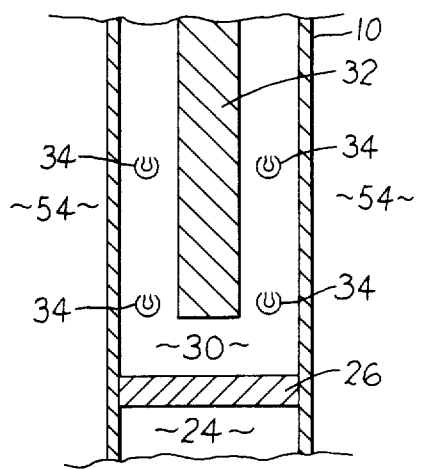
FIG. 6 is a fragmentary, vertical sectional view of another modification of the invention.

The heat-transfer bodies 32 need not directly contact the outer wall of the reaction vessel 10. As shown in FIG. 6, the bodies 32 can, for example, be provided in the center of the combustion chamber 30 spaced from the outer wall of the reaction vessels 10. The heat-transfer bodies 32 can be supported, if necessary, by suitable means, such as a metal mesh, inorganic porous plate, shelf, supporting arm, supporting frame or grating.

The heat contained in the combustion gas that flows out of the combustion chamber 30 is further transferred to the reaction gas flowing in the catalyst bed 54 packed in the reaction space of the reaction vessel 10 while the combustion gas passes through the heat recovery passage 36 and the gas exhaust duct 40.

Among the heat-transfer bodies 32 or portions thereof, the bodies or portions thereof which directly transfer heat to the reaction vessel 10 are the bodies or portions thereof which face the wall of the vessel 10. The heat radiated from the heat-transfer bodies 32 or portions thereof located remote from the reaction vessel 10 is transferred individually to other heat-transfer bodies 32 nearer to the wall of the vessel 10 in succession and eventually is transferred to the wall of the reaction vessel 10 which is at the lowest temperature from the standpoint of thermal gradient across the combustion chamber 30.

The combustion gas which has thus released its own heat to effect the reforming reaction is then discharged from the duct 40. Since an excess of oxygen is generally supplied, based on the primary fuel gas, to form a fuel-air mixture, no deposition of carbon occurs caused by incomplete combustion of the fuel. On the other hand, the fuel gas is apt to be diluted with the excess oxygen until the final stage of the secondary fuel gas is supplied. However, combustion of such a gaseous mixture containing excess oxygen can be made stable and continuous by the aid of the combustion catalyst in the partition section 26, by ignition through heated heat-transfer bodies 32, and by a combustion-promoting catalyst if it is present, as required, in the combustion chamber 30.

The reason why the secondary fuel supply nozzle units 34 are arranged generally in several spaced-apart stages in the chamber 30 is to assure that the heat required for the endothermic reaction is supplied to the reaction vessel 10 with a better temperature distribution along the entire length of the flow path of the raw material gas in the vessel 10. However, the nozzle units 34 can be arranged in a single stage depending on the nature of the endothermic reaction and the scale of the apparatus of the present invention.

The steam reforming reaction of hydrocarbons is described hereunder on the basis of the above-mentioned example. The steam reforming reaction, as is well known, is a very strongly endothermic reaction that is carried out at a temperature of from 700° to 900° C. and a pressure of from atmospheric to 50 kg/cm$^2$G. In order to cause the reaction to proceed to a sufficient extent, it is necessary to supply a large amount of heat to the reaction space where the reaction promoter catalyst is present. For this reason, the heat generation unit 12 of the apparatus of the present invention is advantageously used for the purpose of supplying the heat required for the steam reforming reaction.

Specifically, in the space where the heat-transfer bodies 32 (which contain, as required, a catalyst for promoting combustion of the fuel gas) are packed at least partially, a high temperature combustion gas generated by the combustion of the fuel radiates a part of the heat contained therein directly to the reaction vessel 10 for heating the contents of that vessel. However, a large part of the combustion heat is used for heating the heat-transfer bodies 32, primarily by convection heat-transfer utilizing the very large surface area of the heat-transfer bodies 32 as a heat-transfer area. The combustion heat thus-accumulated in the heat-transfer bodies 32 is used for heating the catalyst bed in the reaction vessel 10 of the apparatus of the present invention and heating the gas flowing through the catalyst bed via the wall of the reaction vessel 10, the combustion heat being radiated from the bodies 32 to the wall of the reaction vessel 10 as a high density gas radiation heat.

The utilization of the very large surface area of the heat-transfer bodies 32 and the high density emission of gas radiation heat, in accordance with the present invention, makes it possible to supply a sufficient amount of heat to the reaction vessel 10, even when the distance between the neighboring reaction vessels 10 is small or, in other words, when the thickness of the combustion gas layer in contact with the reaction vessels 10 is small.

In the reforming apparatus of the present invention, the amount of radiation heat emitted from a unit length of the heat generation unit 12, in the direction in which the fuel gas flows in that unit, to the reaction vessel 10 can be controlled selectively at a desired value. Moreover, the temperature distribution in the direction of the flow of the reactant gas through the reaction vessel 10 can be arranged in a desired manner, by properly locating the relative positions of the reaction vessel 10 and the heat generation unit 12 in the manner as described above and, with respect to the secondary fuel supply nozzle units 34 in the heat generation unit 12 in this positional relationship, by selecting at a desired value the positions and numbers of said nozzle units 34 in the flow direction of the combustion gas, the position and number of secondary gas outlet nozzles and/or the diameter of the gas outlet nozzles within said nozzle units and the amount of the secondary fuel gas or cooling air supplied in each stage.

The controllability of the temperature distribution of the gas flowing through the reaction vessel 10 in this manner is a very substantial advantage of the apparatus of the present invention, regardless of whether or not a catalyst is packed in the reaction vessel 10. As a result, extremely high temperature zones, which previously have been unevenly distributed in the heating space of conventional reactors, can be eliminated so that the selection of materials is greatly facilitated, such as the construction material for the combustion chamber 30 of the present invention and the heat-transfer bodies 32 in the chamber.

The above example describes an embodiment in which a catalyst is packed in the reaction vessel 10 for promoting the reaction. However, the apparatus of the present invention also exhibits the same effect, as described above, when a catalyst is not packed in the reaction vessel 10. As an example in which a catalyst is not used in this manner, there can be mentioned an embodiment in which the reforming reaction is effected by the thermal cracking process.

The proper adjustment of the temperature distribution, by controlling the generation and supply of heat, as described above, makes it feasible to use, as the material for making the apparatus of this invention, particularly the reaction vessel 10, a heat-resistant rolled steel plate or the like, which is lower in cost than heat-resistant cast steel, i.e., the heat-resistant material that is necessarily used in the conventional apparatus of this type.

Similarly, the material of which the heat transfer bodies 32 are made can also be selected from less heat resistant and, therefore, less expensive materials than in the case in which there is not achieved the more uniform temperature distribution that is achieved in the present invention.

The combustion gas, having completed, in the combustion chamber 30, the combustion and heat-transfer to the reaction vessel 10, transfers further heat to the reaction vessel 10 as it passes through the heat recovery passage 36 and the duct 40, aided by the heat-transfer material 38 (a corrugated plate or fins in FIGS. 1B and 2B). The gas flowing from the passage 36 is discharged from the duct 40 to the outside of the apparatus.

On the other hand, the raw material gas, for example, a gas consisting mainly of hydrocarbons and steam when the intended reaction is the steam reforming of hydrocarbons, is properly preheated as required and is introduced into each endothermic reaction vessel 10 packed with a steam reforming catalyst bed 54, from at least one supply pipe 50 connected to the upper end of the reaction vessel 10. The raw material gas then enters the catalyst bed 54 (reaction space) via a catalyst bed upper space 52, and passes downwardly through the catalyst bed 54 in the opposite direction to the flow of combustion gas in the heating system while undergoing the endothermic reaction, thereby completing the reaction.

The gas then flows through a catalyst bed supporting mesh 56 and a catalyst bed lower space 58 into product gas recovery passages 60 (typically composed of a plurality of tubes). The passages 60 penetrate the catalyst bed 54 and the catalyst bed supporting mesh 56. The axes of the product gas recovery passages 60 extend vertically and parallel to each other at substantially equally spaced-apart locations relative to the imaginary central vertical plane that divides the space in each reaction vessel 10 into two equal right and left parts. The gas flows upwardly through these passages 60 while exchanging heat with the gas flowing countercurrently downwardly in the catalyst bed 54 and exits from the upper ends of said passages to the outside of the system.

Figure 3:
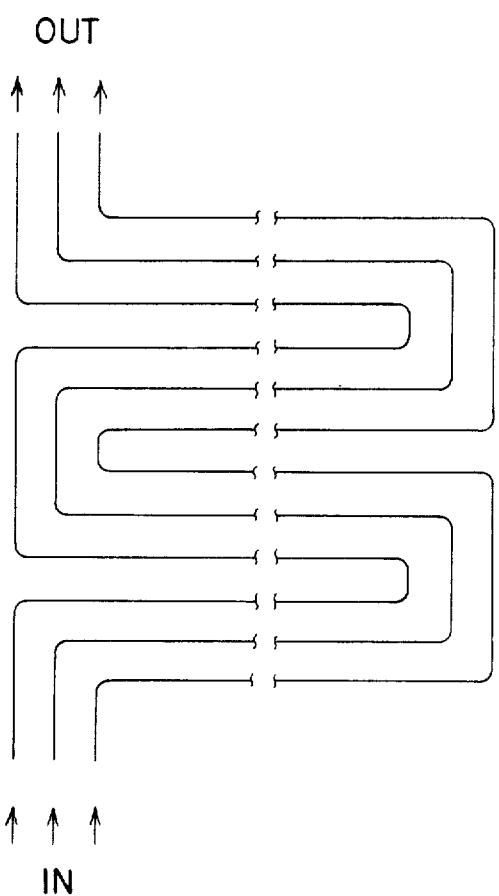
FIG. 3 is a schematic view substantially as taken along line III—III in FIG. 1A.

It is preferable to bend the upper ends of passages 60 into parallel sinuous shapes 61 (FIG. 3) in the sections of the passages 60 corresponding in height approximately to the heat recovery passage 36, in order to promote the heat-transfer in the corresponding space in the vessel 10 and the catalyst bed 54.

The recovery passages 60 can have fins on their outsides. Alternatively, a heat radiation promoter, such as a plate or shaped material of various shapes, can be inserted in the interiors of the passages 60. Alternatively, the upper ends of the passages 60 can be replaced by one or more plate-fin heat exchangers 64 as shown in FIGS. 1B and 2B.

In some cases, instead of using a set of round tubes, the recovery passages 60 can be made of a plate-fin heat exchanger or one or more flattened tubes which extend in the vertical direction. This is exemplified by the recovery passages 60 in the reaction vessels 10 in the rightmost part in FIG. 5.

Each recovery passage 60 can exit from the reaction vessel 10 individually, penetrating the wall thereof to the outside of the system (FIG. 1A). Alternatively, the passages 60 can be combined, for example, by a header structure in the vessel 10 by means of a plate-fin heat exchanger or the like and communicates to the outside of the system through at least one exit pipe 68 (FIG. 1B), penetrating the wall of the reaction vessel 10, whereby the product gas is taken out to the outside of the system. In the case of using a plate-fin heat exchanger 64 (FIG. 2B), it communicates with the upper ends of the tubular recovery passages 60 of the product gas by means of a lower horizontal header tube 62 and to the exit pipe 68 by means of an upper horizontal header tube 66.

The catalyst bed 54 is supported by the supporting net 56 which is positioned at approximately the same height as that of the preheating chamber 24. The catalyst bed 54 in the reaction vessel 10 is packed with a catalyst up to a height above the upper end of the recovery passage sinuous section 61 (FIG. 1A) or plate-fin heat exchanger 64 (FIG. 1B), and, in addition, above the upper end of the exhaust duct 40 at the upper end of the heat generation unit 12. The upper space 52 is provided above the upper end of the catalyst bed 54.

The preheating chamber 24 in the heat generation unit 12 is a small space situated above the partition section 20 and below the combustion catalyst bed 26. Positioned above the combustion catalyst bed 26 is the combustion chamber 30 which is packed at least partially with the heat-transfer bodies 32 approximately up to the height of the lower end of the recovery passage sinuous section 61 (FIG. 1A) or plate-fin heat exchanger 64 (FIG. 1B). All of the combustion chamber 30, heat recovery passage 36 and exhaust duct 40 positioned successively thereabove transfer heat to the catalyst bed 54 or reaction space through the wall of the reaction vessel 10.

The catalyst bed upper space 52 has no substantial heat-exchanging relation with the heat generation unit 12. In some cases, the product gas flowing in the upper part of the recovery passages 60 or plate-fin heat exchanger 64, the upper horizontal tube 66 and the exit pipe 68, may preheat the raw material gas that has entered the upper space 52 from the raw material gas supply pipe 50 prior to the raw material gas entering the catalyst bed. The reaction vessels 10 are preferably provided with the braces 11 for reinforcement, particularly when the vessels are of a flat box shape.

In the above, the combustion gas that passes through the heat recovery passage 36 and the exhaust duct 40 imparts heat to the gas flowing through the catalyst bed 54 or to the reaction space when the reaction vessel 10 does not employ a catalyst. However, as occasion demands, the combustion gas can be used to preheat at least one of the raw material gas, fuel gas and oxygen-containing gas that are about to enter the apparatus of the present invention.

In the reforming apparatus of the present invention, as described above, at least 50% of the length, measured in the main flow direction of the reaction gas or in the vertical direction in FIGS. 1A and 1B, of the catalyst bed 54 or reaction space which is in heat transfer relationship with the combustion chamber 30 via the wall of the reaction vessel 10 preferably is sandwiched or surrounded by the heat-transfer bodies 32 for each reaction vessel 10.

Accordingly, the reaction vessels 10 and the heat generation units 12 are arranged in such a way that the main flow directions of both of the different gases flowing therethrough are vertical (neglecting the turbulence due to various packing materials, and except in the zones in which the direction of flow is changed like the catalyst bed lower space 58, the recovery passage sinuous section 61, and the horizontal tubes 62 and 66). The combustion chamber 30 is in indirect heat-exchange relationship with the reaction space or reaction catalyst bed 54 through the wall of the reaction vessel 10. The heat-transfer bodies 32 are packed in the combustion heating chamber 30 so as to extend for 50% or more of the length of the reaction space or catalyst bed. If less than 50% of the length of the catalyst bed 54 or reaction space in heat-exchange relationship with or faced by and sandwiched by or surrounded by the heat-transfer bodies 32, measured in the gas flow direction of each reaction space or catalyst bed, the heat-transfer effect is liable to be insufficient. In the cases illustrated in FIGS. 1A and 1B, the section packed with the heat-transfer bodies 32 is comprised of a plurality of vertically spaced-apart zones in the combustion chamber 30. In such case, the lengths of each zone packed with the heat-transfer bodies 32 and which are in contact with the reaction space or catalyst bed 54 should be added up.

Now, regarding the reaction vessel 10 in FIGS. 1A and 1B, it is generally preferable, but not essential, for the object of the present invention that the right and left nozzle units 34 and the sections in which the heat-transfer bodies 32 are packed are arranged symmetrically as illustrated in the drawing. To be "sandwiched" as described herein, signifies that the heat-transfer bodies 32 are present in some arrangement on both of the left and right sides, in the case of FIGS. 1A and 1B, of the reaction vessel 10, being in contact with, or facing and spaced from, the outer wall of the vessel 10. In such a case, the sum of the vertical lengths of the walls of the reaction vessel 10 that are in heat-transfer relationship with heat-transfer bodies 32 on both sides preferably is 50% or larger of the sum of the vertical lengths of the reaction space or catalyst bed.

The present invention has been described in relation to a case in which the fuel gas flows vertically in the upward direction. Instead, the fuel gas can flow in the vertically downward direction, horizontal direction or inclined direction, as may be required in practicing the present invention. In general, the vertical gas flow is preferable because it minimizes unevenness of heat-transfer and increases the ease of construction and operation.

The apparatus of the present invention as shown in FIGS. 1A, 1B, 2A and 2B comprises a given number n of the reaction vessels 10 and n+1, heat generation units 12 arranged alternatively in the transverse (left-to-right) direction in FIG. 1A, the reaction vessels and heat generation units, respectively, having the same lengths in the depth direction in FIGS. 1A and 1B. The periphery and the top and bottom of the apparatus are covered by an insulating material 80.

Figure 7:
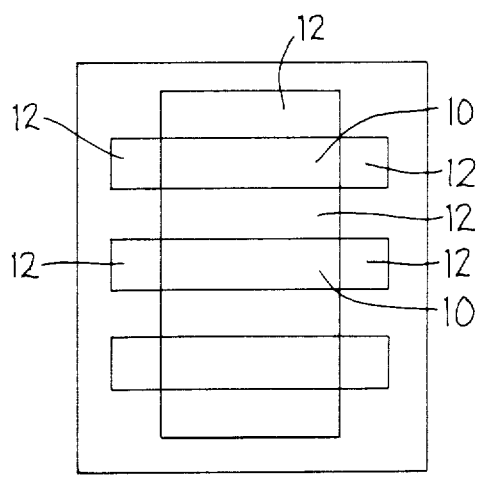
FIG. 7 is a schematic plan view of another modification of the invention.

In some cases, in the apparatus of the present invention, heating units 12 can also be provided covering the two end faces of the reaction vessels 10 as shown in FIG. 7. In other words, each vessel 10 may be surrounded on all four sides thereof entirely by heat generation units 12. Alternatively, as shown in FIG. 5, the reaction vessels 10, which are flat and parallel to each other, can be disposed in a rank-and-file arrangement.

The periphery of the apparatus is covered by a layer of an insulating material in the present invention. Further, it is advantageous to apply insulating material at least to the undersides of the reaction vessels 10 for purposes of heat economy. The insulation can, however, be omitted under the air duct 14 and the mixing chamber 18, particularly under the air duct, of the heat generation unit 12 in FIGS. 1A and 1B, when the fuel gas or air is not preheated. In the apparatus of the present invention, as illustrated in FIGS. 1A and 1B, the upper wall of insulating material 80 is applied so that the upper part of the reaction vessel 10 including the raw material gas supply pipe 50, the product gas recovery pipe 60 or 68, the exhaust duct 40, the heat recovery passage 36 are uncovered and exposed to the outside. However, it may be preferred to cover at least a part of them as required in view of heat balance, apparatus assembly process and the like. When the outer shape of the apparatus is complicated, as in FIGS. 1A and 1B, the insulating material can be applied in such a manner that the exposed section is covered by a properly shaped covering and the space between the section and the covering is filled with a packing type insulating material.

Since the heat recovery passages 36 have a smaller width or lateral thickness than the combustion chambers 30, etc. located under those recovery passages in FIGS. 1A, 1B, 2A and 2B, from the standpoint of efficiency of heat-transfer to the reaction vessel, there is a space between the two adjacent heat recovery passages 36 which are individually in contact with the adjacent reaction vessels 10, respectively. This space can be filled with an insulating material, if necessary, as shown in FIGS. 1A and 1B. It is possible to design a structure having no such space, in other words, there can be provided a single intermediate heat recovery passage 36 arranged in common with the two adjacent reaction vessels, or two adjacent heat recovery passages 36 can be provided in contact with each other and respectively associated with one of the two adjacent reaction vessels 10.

In the apparatus according to the present invention, the heat-transfer bodies 32 in the combustion chamber 30 can be made of a heat-resistant solid material, including a heat-resistant metal having a high content of nickel, such as nichrome, as well as alumina, silicon carbide, ceramics and similar materials, quartz glass, and the like. The bodies 32 can preferably be porous, having gas-permeable holes with a size of approximately 1-20 mm. The heat-transfer bodies 32 serve to transfer heat from the combustion gas to the reaction vessel 10 as described above.

As specific shapes of the heat-transfer bodies 32, there can be mentioned typical ones which are made of linear materials of filament-like shape, such as a wadding- or stuffing-like material, or piled meshes consisting of wire or fiber made of the above-described materials. When the body is made of quartz glass or other ceramic, it can be of a bulky shape like a spiral bar thicker than the aforesaid linear or fiber materials. It can be a body consisting of one or more ceramics or metals shaped in a three-dimensional lattice or mesh structure as a whole. A combination consisting of two or more of these bodies can be used. The bodies can also be packed by changing the packing density or material composition in the flow direction of the combustion gas or a direction perpendicular thereto, if necessary. Bodies carrying, at least partially, a combustion catalyst can also be used if needed.

In a reaction vessel 10 free of catalyst, in the space in the reaction gas recovery passage 60 and in the space in the heat recovery passage 36, there can be packed at least one packing material selected from the above heat-transfer bodies free of catalyst, a plate-like material, such as a corrugated plate and twisted ribbon plate, and various packings, such as Raschig rings, Lessing rings, Berl saddles, Intalox saddles and Tellerette packing, as required, and/or fins can be provided on the heat-transfer surface, thereby improving the heat-transfer to or from the gas passing through said spaces.

These materials can also be used in the porous partition section 20 between the mixing chamber 18 and the preheating chamber 24.

The reforming apparatus, according to the present invention, is useful in (1) a steam reforming reaction in which a raw material-containing natural gas, petroleum gas or the like, and steam, is reformed by bringing it into contact with a catalyst to produce a reformed gas containing hydrogen, carbon monoxide, carbon dioxide and the like, (2) a steam reforming reaction in which a raw material containing methanol and steam is reformed by bringing it into contact with a catalyst to produce a reformed gas containing hydrogen, carbon monoxide, carbon dioxide and the like, (3) the thermal cracking reaction in which a raw material, such as ethane, liquefied petroleum gas, naphtha or the like, is cracked by heat in the presence of steam to produce a gas containing olefins, such as ethylene, propylene and butylene, and (4) the thermal cracking reaction in which a raw material containing methanol is cracked thermally in the presence or absence of steam to produce a gas containing hydrogen, carbon monoxide, carbon dioxide and the like.

In the present invention, the fact that the heat-imparting combustion gas flowing through the combustion chamber 30 and the heat-receiving reaction gas flowing through the reaction vessel 10 flow countercurrently with respect to each other, thereby transferring heat from the former to the latter, as well as the use of the secondary fuel supply units 34, make it possible to cause the reaction in vessel 10 to proceed in a favorable state and to facilitate the utilization of heat of the gas after the reaction.

On the other hand, in an arrangement in which multiple stages of reaction vessels 10 are disposed parallel to each other, but are not disposed substantially in countercurrent parallel flow direction relative to the flow of the heating gas, but rather, are disposed, for example, perpendicular to the flow of the heating gas in the combustion heating chamber 30, it is not possible to change the packing density and composition of the heat-transfer bodies, as is practiced in the present invention, for establishing preferable heat-receiving conditions of the gas flowing through vessel 10 in accordance with the progress of the reaction in vessel 10. Therefore, this latter arrangement cannot impart heat properly to the reaction gas and, thus, is not suited for achieving the objects of the present invention.

Unlike the apparatus of the present invention as described above, a comparative apparatus has been designed in which a reaction vessel is heated by feeding fuel gas and air for combustion from the bottom of a combustion chamber and burning the fuel in a space packed with Berl saddles, without employing the split supply of fuel and the packing of the heat-transfer bodies 32 as is practiced in the apparatus of the present invention. In this case, the heat supply to the reaction vessel 10 is unfavorably concentrated substantially at the lower one-half thereof, exceeding the heat resistant limit of the reaction vessel 10 in this lower section and the packings therein. When the reaction vessels 10 are heated by supplying a fuel gas and air for combustion to the bottom of the combustion chamber without employing the split supply of fuel and without packing the heat-transfer bodies 32 in the combustion chamber as is practiced in the apparatus of the present invention, it is necessary to increase the thickness (width) of the combustion gas layer which is in contact with the reaction vessel 10, for example, by increasing the spacing between the neighboring reaction vessels. As a result, the thickness (width) of the space of the combustion chamber 30 between the neighboring reaction vessels 10 is uneconomically increased, for example, about three times.

Some of the effects of the present invention have already been described above. However, their main points will be summarized hereunder.

In the apparatus of the present invention, the raw material gas and the fuel gas flow in parallel but in opposite directions with respect to each other; the total fuel gas supply is divided into a primary fuel gas supply and a secondary fuel gas supply during feeding; the fuel gases are burned primarily in a combustion chamber 30 packed at least partially with heat-transfer bodies 32; and the secondary fuel gas is split and supplied in multiple stages at 34, as required. Accordingly, the heat required for an endothermic reaction in the reaction vessel 10 can be supplied so as to achieve a proper temperature distribution in and along the flow direction of the raw material gas, and the space for combustion and the space for heat-transfer can be integrated so as to minimize the size of the apparatus. A less expensive construction material can be used, thereby facilitating the selection of the material for making the heating chamber 30.

By using a section comprising a combustion catalyst bed 26 containing a catalyst capable of effecting oxidation combustion of a fuel gas, a fuel gas generally mixed with an excess of oxygen is ignited and/or burned or begins to burn smoothly, mildly and evenly and flows into the combustion chamber 30. Consequently, a reliable and safe combustion can be started and the combustion, heat generation, heattransfer and the like in the combustion heating chamber 30 can be carried out at a desired temperature distribution, thereby attaining the object of the present invention.

No dependence on a particular structure exists, such as that using porous tubular coverings which require delicate adjustment. The use of simple and easy maintenance parts and structure with regard to supply and combustion of gas through a porous material make easy the design, fabrication, and maintenance and control of the apparatus.

When the reaction vessel 10 has a structure of a flat rectangular box sandwiched by heat generation units 12, the reaction can be conducted at a relatively low pressure, such as from atmospheric to 5 kg/cm$^2$G. As compared with the conventional structure in which a number of tubular reaction vessels are placed in a heat generation unit, the structure of the apparatus of the present invention is improved in the uniformity of the heat-transfer to each reaction vessel and is advantageously facilitated in the ease of design and fabrication for realizing this uniformity.

The reverse-parallel or countercurrent flow of the raw material relative to the flows of the fuel gas and the product gas contributes to the miniaturization (size-reduction) of the apparatus and the effective recovery of heat.

Further, the present invention permits the volume of the combustion chamber/heating chamber 30 in this type of reforming apparatus to be reduced to a large extent. Although the degree of the reduction varies greatly depending on the particular type of reforming reaction that occurs therein, the temperature required for the reforming reaction, the performance of the catalyst to be used, and the like, the volume required for the combustion chamber/heating chamber 30 can be reduced to approximately $\frac{1}{3}$-1/5 of that of the standard design in the conventional apparatus. This volume reduction in the combustion chamber/heating chamber leads to a reduction in the amounts of construction materials of the combustion chamber/heating chamber, particularly, heat-resistant materials including heat resistant bricks and insulating materials, and in the manhours for the construction of the furnace, and further leads to a reduction in the cost required for foundation work and the length of the construction period due to the resultant reduction in weight of the furnace, thus leading to the overall reduction in the construction cost of this type of apparatus.

Further, in accordance with the present invention, the heat supplied to each unit length of the reaction vessel, including reforming tubes, in the flow direction of the raw material gas can be controlled to a desired amount in the manner as described above. In general, in this type of reforming reaction, the reaction velocity increases and the reaction equilibrium functions more advantageously as a higher temperature is used, with the result that the apparatus can be miniaturized (reduced in size). Accordingly, the reforming reaction is generally effected by increasing the temperature to the heat resistant limit of the reaction vessel, such as the reforming tubes and packing materials. In the case where the abovedescribed control is impossible, however, it becomes necessary not to increase the heat load per unit heat-transfer area of the surface of the reaction vessel above a certain point due to the uneven distribution of heat, thus making it difficult to miniaturize (reduce the size of) the reforming apparatus further. In the apparatus of the present invention, however, it is feasible to miniaturize (reduce the size of) the reforming apparatus further with safety, without exceeding the heat-resistant limit of the reaction vessel owing to the proper distribution of heat.

What is claimed is:

1. A reaction apparatus comprising: at least one reaction vessel for effecting an endothermic reaction and heat generation means on the outside of and in contact with said reaction vessel;

said heat generation means comprising a mixing chamber at one end of said heat generation means, means for supplying primary fuel gas to said mixing chamber and means for supplying an oxygen-containing gas to said mixing chamber so that said fuel gas and said oxygen-containing gas are mixed together in said mixing chamber;

a preheating chamber for receiving said mixture of said fuel gas and said oxygen-containing gas and preheating said mixture;

a gas-permeable catalyst bed containing a catalyst for causing combustion of said preheated mixture, said catalyst bed being disposed adjacent to said preheating chamber for receiving said preheated mixture therefrom;

a combustion chamber for receiving the burning mixture from said catalyst bed, said combustion chamber containing secondary fuel gas supply means for supplying additional fuel gas to said combustion chamber, said combustion chamber containing heat-transfer bodies at least partially filling said combustion chamber;

and first discharge means for discharging gaseous products of combustion from said combustion chamber, wherein said mixing chamber, said preheating chamber, said gas-permeable catalyst bed, said combustion chamber and said first discharge means are arranged in series in that order from said one end of said heat generation means to the opposite end thereof;

said reaction vessel being contacted by said combustion chamber, whereby heat is transferred from said combustion chamber to said reaction vessel;

means for supplying a reactant gas to said reaction vessel at a location beyond said opposite end of said heat generation means, thence flowing said reactant gas through said reaction vessel in a direction opposite to the direction in which fuel gas and gaseous products of combustion of said fuel gas flow through said heat generation means whereby to cause the reactant gas to react to form a reaction product gas, at least one discharge passage means extending into said reaction vessel for isolating said reaction product gas from said reactant gas and flowing it through said reaction vessel in the same direction as the direction in which fuel gas gaseous products of combustion thereof flow through said heat generation means;

and second discharge means for discharging said reaction product gas from said discharge passage means.

2. An apparatus as claimed in claim 1 in which said reaction vessel has two parallel sidewalls which extend through and contact said combustion chamber, said at least one discharge passage means comprises a plurality of tubes defining a plurality of said discharge passage means disposed in a plane midway between said sidewalls and extending parallel with each other and parallel with said sidewalls.

3. An apparatus as claimed in claim 2 in which said tubes have regions of increased heat recovery including at least one plate-fin or flat tubular plate heat exchanger disposed therein.

4. An apparatus as claimed in claim 1 comprising a plurality of said reaction vessels, said reaction vessels being hollow, rectangular vessels and having two parallel sidewalls which are parallel to and spaced from each other, said heat generation means comprising a plurality of heat generation units disposed in alternating arrangement with said reaction vessels and disposed between the opposite sidewalls of adjacent reaction vessels so that each reaction vessel is sandwiched between a pair of said heat generation units.

5. An apparatus as claimed in claim 4 in which in each of said heat generation units there is provided a heat recovery passage between said combustion chamber and said first discharge means so that said gaseous products of combustion flow through said heat recovery passage, said heat recovery passage being in indirect heat exchange relationship with the adjacent reaction vessel.

6. An apparatus as claimed in claim 5 which heat-transfer-increasing means of an enlarged surface area are provided in contact with or joined to the sidewall of said reaction vessel and extend into said heat recovery passage.

7. An apparatus as claimed in claim 6 in which said discharge passage means has a region of increased heat recovery disposed in lateral alignment with said heat-transfer-increasing means so that a portion of the space where the gaseous endothermic reaction occurs is sandwiched between said heat-transfer-increasing means and said region of increased heat recovery.

8. An apparatus as claimed in claim 2 in which said tubes have regions of increased heat recovery defined by parallel, sinuous portions.

9. An apparatus as claimed in claim 1 in which said gas-permeable catalyst bed is made of a porous inorganic body or is comprised of a mass of inorganic filaments or wires.

10. An apparatus as claimed in claim 1 in which said reaction vessel is at least partially filled with a bed of catalyst for effecting an endothermic reaction.

11. An apparatus as claimed in claim 1 in which a porous partition section is provided in said series between said mixing chamber and said preheating chamber.

12. An apparatus as claimed in claim 1 including a layer of heat insulating material covering the outside of the reaction apparatus.

* * * * *

UNITED STATES PATENT AND TRADEMARK OFFICE
CERTIFICATE OF CORRECTION

PATENT NO. : 4 714 593

DATED : December 22, 1987

INVENTOR(S) : Akio NAITO et al

It is certified that error appears in the above-identified patent and that said Letters Patent is hereby corrected as shown below:

Column 16, line 13; after "gas" insert ---and---.

Signed and Sealed this

Twenty-first Day of June, 1988

Attest:

DONALD J. QUIGG

Attesting Officer

Commissioner of Patents and Trademarks